(12) United States Patent
Muffie (10) Patent No.: US 9,713,301 B2
(45) Date of Patent: Jul. 25, 2017

(54) METHOD FOR DISPLACING BEES IN VEGETATION SUBJECT TO MOWING OR CUTTING

(71) Applicant: Kevin Michael Muffie, Saltsburg, PA (US)

(72) Inventor: Kevin Michael Muffie, Saltsburg, PA (US)

(*) Notice: Subject to any disclaimer, the term of this patent is extended or adjusted under 35 U.S.C. 154(b) by 0 days.

(21) Appl. No.: 15/273,975

(22) Filed: Sep. 23, 2016

(65) Prior Publication Data

US 2017/0006778 A1 Jan. 12, 2017

Related U.S. Application Data

(62) Division of application No. 14/504,745, filed on Oct. 2, 2014, now Pat. No. 9,474,210.

(51) Int. Cl.
| A01D 46/00 | (2006.01) |
| A01D 87/10 | (2006.01) |
| A01D 34/00 | (2006.01) |
| A01D 43/00 | (2006.01) |
| A01K 29/00 | (2006.01) |
| A01D 43/02 | (2006.01) |
| A01K 15/00 | (2006.01) |

(Continued)

(52) U.S. Cl.
CPC ......... *A01D 34/001* (2013.01); *A01D 43/00* (2013.01); *A01D 43/02* (2013.01); *A01D 75/20* (2013.01); *A01K 15/00* (2013.01); *A01K 29/00* (2013.01); *A01K 55/00* (2013.01); *A01D 2101/00* (2013.01)

(58) Field of Classification Search
CPC .... A01G 1/125; E01H 1/0809; E01H 1/0836; E01H 1/0872; A47L 5/14; A47L 2/08; Y10S 56/08; Y10S 56/09; A01B 51/02; A01D 43/00; A01D 34/001
USPC ................................................. 15/405, 340.4
See application file for complete search history.

(56) References Cited

U.S. PATENT DOCUMENTS 3,430,421 A * 3/1969 Matthews ............... A01D 34/02
56/1
3,441,089 A * 4/1969 Minton .................. A01D 34/84
172/14

(Continued)

OTHER PUBLICATIONS

Millman, Joel. "A Scientist Teaches Drones and Queens the Birds and Bees," The Wall Street Journal, Oct. 2, 2013, US, entire article.

(Continued)

*Primary Examiner* — Árpád Fábián-Kovács
(74) *Attorney, Agent, or Firm* — Karen Tang-Wai Sutton (57) ABSTRACT

A method for displacing bees from vegetation subject to cutting by a mowing machine having a cutting deck and using a blower assembly affixed to the mowing machine. The assembly is provided as a fan or motorized blower affixed to a funnel. In operation, the fan or motorized blower creates then forces a concentrated air stream into the funnel that then directs the concentrated air stream to an area of vegetation immediately in front of the cutting deck, displacing bees in the area of vegetation prior to cutting. A funnel mouth is oriented so that the emitted air stream is at least as wide as the cutting deck, and multiple blower assemblies or larger funnel attachments may be used to accommodate larger cutting decks. The method includes selective actuation of the blower while operating the mowing machine.

1 Claim, 11 Drawing Sheets

(51) Int. Cl.
*A01K 55/00* (2006.01)
*A01D 75/20* (2006.01)
*A01D 101/00* (2006.01)

(56) References Cited

U.S. PATENT DOCUMENTS

| | | | | |
|---|---|---|---|---|
| 3,603,162 A * | 9/1971 | Gohler | ............. | A01B 51/02 |
| | | | | 172/108 |
| 3,959,846 A * | 6/1976 | Yasuda | ............. | A01G 1/125 |
| | | | | 15/331 |
| 3,968,938 A * | 7/1976 | Ruhl | ............. | E01H 1/0836 |
| | | | | 15/330 |
| 4,945,604 A * | 8/1990 | Miner | ............. | A47L 5/14 |
| | | | | 15/344 |
| 5,090,088 A * | 2/1992 | Toth | ............. | A01G 1/125 |
| | | | | 15/354 |
| 5,231,827 A * | 8/1993 | Connolly | ............. | A01G 1/125 |
| | | | | 241/101.1 |
| 5,272,858 A * | 12/1993 | Bonis | ............. | A01D 51/00 |
| | | | | 15/340.2 |
| 5,435,118 A * | 7/1995 | Cobile | ............. | A01D 34/005 |
| | | | | 56/13.4 |
| 5,778,646 A * | 7/1998 | Pfisterer | ............. | A01G 1/125 |
| | | | | 15/340.4 |
| 5,848,521 A * | 12/1998 | Kobayashi | ............. | A01G 1/125 |
| | | | | 15/340.4 |
| 6,185,917 B1 * | 2/2001 | Goudes | ............. | B62B 3/02 |
| | | | | 56/12.8 |
| 6,226,833 B1 * | 5/2001 | Kawaguchi | ............. | A01G 1/125 |
| | | | | 15/330 |
| 6,658,833 B2 * | 12/2003 | Dunning | ............. | A01G 1/125 |
| | | | | 56/16.6 |
| 8,225,450 B2 * | 7/2012 | Petersen | ............. | A47L 9/06 |
| | | | | 15/106 |
| 8,387,205 B2 * | 3/2013 | Weihl | ............. | A01D 42/06 |
| | | | | 15/347 |
| 8,579,058 B1 * | 11/2013 | Yamada | ............. | A01D 43/00 |
| | | | | 180/53.8 |
| 2003/0204932 A1 * | 11/2003 | Hile | ............. | A01B 45/00 |
| | | | | 15/340.4 |
| 2003/0221399 A1 * | 12/2003 | Hall | ............. | A01B 33/028 |
| | | | | 56/2 |
| 2015/0296718 A1 * | 10/2015 | Houseman | ............. | A01G 1/125 |
| | | | | 56/17.5 |

OTHER PUBLICATIONS

Wills, Rick. "Global Warming Skeptic Wary of Worries about Bee Colony Collapse Disorder," TribLive online news Sep. 22, 2013, Pittsburgh Tribune Review, US, entire article.

Walsh, Bryan. "The Plight of the Honeybee," Time Magazine, Aug. 19, 2013, US, entire article.

* cited by examiner

METHOD FOR DISPLACING BEES IN VEGETATION SUBJECT TO MOWING OR CUTTING

CROSS REFERENCE TO RELATED APPLICATION

This application is a divisional of U.S. application Ser. No. 14/504,745 filed 2 Oct. 2014, and which is incorporated herein by reference in its entirety.

TECHNICAL FIELD

The present invention pertains to the field of gardening implements. More particularly, the present invention pertains to a detachable or an integrated blowing assembly and other mechanical means for use with motorized mowing machines, for displacing honeybees and other animals from vegetation immediately prior to mowing, so as to save the animals from being killed by the mowing machine.

BACKGROUND OF THE INVENTION

Honeybees worldwide are threatened by a mysterious problem known as Colony Collapse Disorder, or CCD, where the colony loses significant numbers of adult bees and thus cannot sustain itself. This disorder affects the European Honeybee, a valuable pollinator and honey producer here in the US and in Europe. The cause of CCD is unknown at this time, and beekeepers, scientists, and citizens alike are interested in saving as many bees as possible. For instance, the Aug. 19, 2013 issue of Time Magazine features a front page story on the plight of the honeybee, the Sep. 23, 2013 issue of the Pittsburgh Tribune Review featured a story on the European response to CCD, and the Oct. 2, 2013 issue of the Wall Street Journal features a front page article by Joel Millman entitled "A Scientist Teaches Drones and Queens the Birds and Bees" discussing ways in which scientists are trying to reinvigorate honeybee populations by crossbreeding and introducing more diverse genetic material into native honeybee populations. These articles, and many more, discuss an "all the above" approach to the problem of CCD and saving as many bees as possible.

Honeybees love clover, a common plant found in fields and lawns. The bees are so determined to collect pollen from clover and other flowers ordinarily found in lawns and fields that they will not move out of the way, even with the maw of a noisy lawn mower bearing down on them. In some cases, the lawn mower operator can shoo the bee away from the front of the mower, but in many cases, the bee will tenaciously grasp the flower to avoid being dislodged by even moderately strong winds or agitation by sticks, and worse, the operator often cannot even see the bee, who might be on the underside of the flower or otherwise hidden. Hundreds of bees are killed during a single mowing of a typical American lawn, and about 75% of the bees killed by mowing are the ones busy pollinating flowers in the mowed vegetation. Furthermore, placing anything in front of an operational lawn mower creates a danger to the operator, as any attachment to the front of the lawn mowing machine may inhibit the operation of the mower itself and distractions in general are dangerous.

What is needed is a method and assembly to displace bees from fields and lawns that does not harm the bees, is easy to use, and can be safely retrofitted to a number of different lawn mowing machine styles.

DISCLOSURE OF THE INVENTION

Accordingly, a first aspect of the invention provides an improved funnel attachment for a bee displacement assembly, the funnel attachment having walls defining a passageway with a neck opening and opposed mouth opening, and a midpoint positioned between the neck and the mouth, wherein the passageway is further defined by a pair of opposed sidewalls, a ceiling and a floor, the ceiling and the floor arranged in a spaced apart relationship defining a first diameter, wherein at the midpoint, the first diameter tapers to the mouth such that the first diameter at the neck is greater than the first diameter at the mouth.

Also, in accord with the first aspect of the invention, the funnel attachment is further provided with the sidewalls arranged in a spaced apart relationship defining a second diameter, wherein at the midpoint, the sidewalls flare away from each other and terminate at the mouth, such that the second diameter at the mouth is greater than the second diameter at the neck.

A second aspect of the invention provides for a displacement assembly used with a motorized mowing machine, the displacement assembly including a blower assembly having a blower and having the funnel attachment affixed to the blower assembly. The blower assembly is positioned on the front of the motorized mowing machine.

Also, in accord with the second aspect of the invention, the blower is powered by its own motor or by a pulley-belt system coupled to a fan and to a motor of the motorized mowing machine.

Also, in accord with the second aspect of the invention, the displacement assembly is selectively operated by power means and a control assembly.

A third aspect of the invention provides for a displacement assembly kit comprising the blower, the funnel attachment, power means, and adaptors allowing the displacement assembly to be affixed to the motorized mowing machine.

Still in accord with the third aspect of the invention, wire harnesses are provided to couple the power means to the blower for simple installation.

A fourth aspect of the invention provides for a rake having a plurality of tines, the rake positioned on the mowing machine so as to agitate vegetation directly in front of a cutting deck of the mowing machine.

A fifth aspect of the invention provides for a method of displacing animals while mowing vegetation, according to the steps of positioning the displacement assembly so that the vegetation agitation portion of the displacement assembly disturbs an area of vegetation directly in front of the mowing machine cutting deck during operation of the mowing machine. The method provides for use of the rake apparatus as well as the blower assembly, used either separately or together, to agitate vegetation.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.
20 blower assembly
22 funnel attachment
22a neck of funnel
22b midpoint
22c mouth of funnel
22d wall
23A first diameter (height) measured at neck
23C first diameter (height) measured at mouth
23B length of wall
23E second diameter (width) measured at neck
23H second diameter (width) measured at mouth
23G length of wall
23D mouth extension
28 blower box
26 blower
30 power assembly
30a power bracket
30b battery or power supply
30c power supply on/off controls
30d battery charger
30e first wire harness
30f second wire harness
30g fastener
40 angled bracket
40a lower position of angled bracket
40b upper position of angled bracket
42 bumper bracket
42a first fastener
42b blower clamp
42c second fastener
42d third fastener
42e bumper clamp
42f fastener
46a rake bracket for push mower
46 rake bracket for riding mower
48 bracket for professional mower
560 rake assembly
50a head
50b tines
60 method for displacing bees
60aa determine if mowing machine has a bee displacement assembly already affixed
60a affix bee assembly to mowing machine
60b determine if bee displacement assembly is in an operational position
60c actuate bee displacement assembly
60d position bee displacement assembly into operational position
70 second blower assembly
70a shaft
70b clutch
70c drive pulley
70d belt
70e pulley
70f motor of mowing machine
70g pulley-belt system
72 fan housing or secondary deck
72a hole
74 fan
90a push-style mowing machine
90b residential-style riding mowing machine
90c deck of mowing machine
90d professional-style riding mowing machine
92 bumper or front bar
94 handle portion of mowing machine

DETAILED DESCRIPTION

Figure 13:
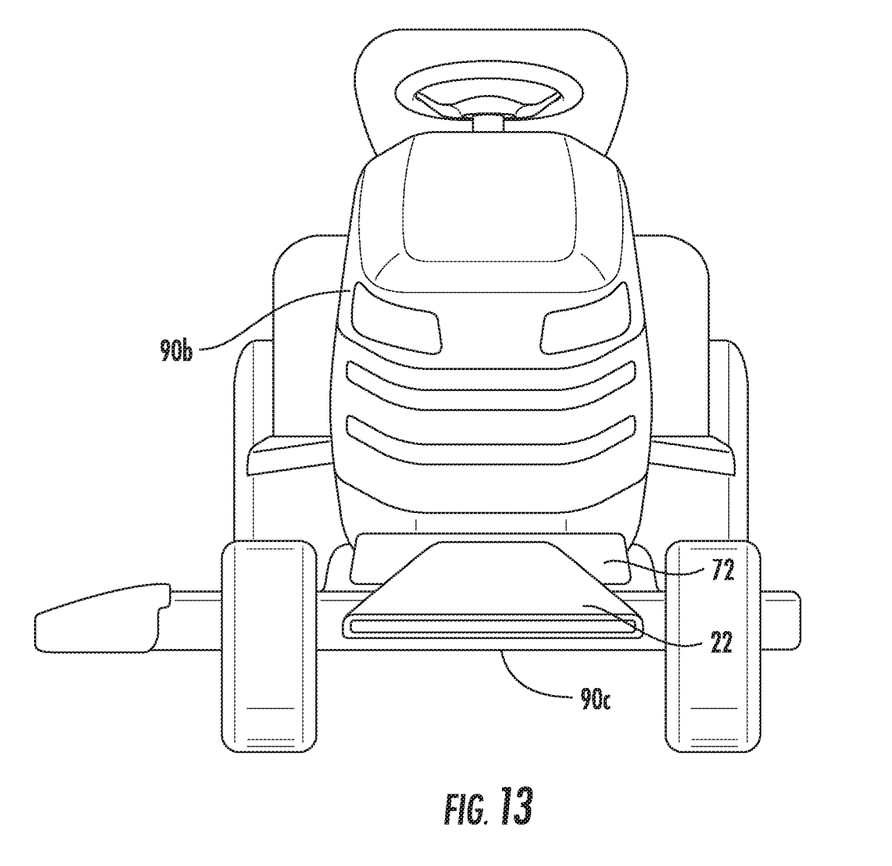
FIG. 13 is a front elevational view of the second embodiment of the bee displacement assembly in FIG. 11.
Figure 14:
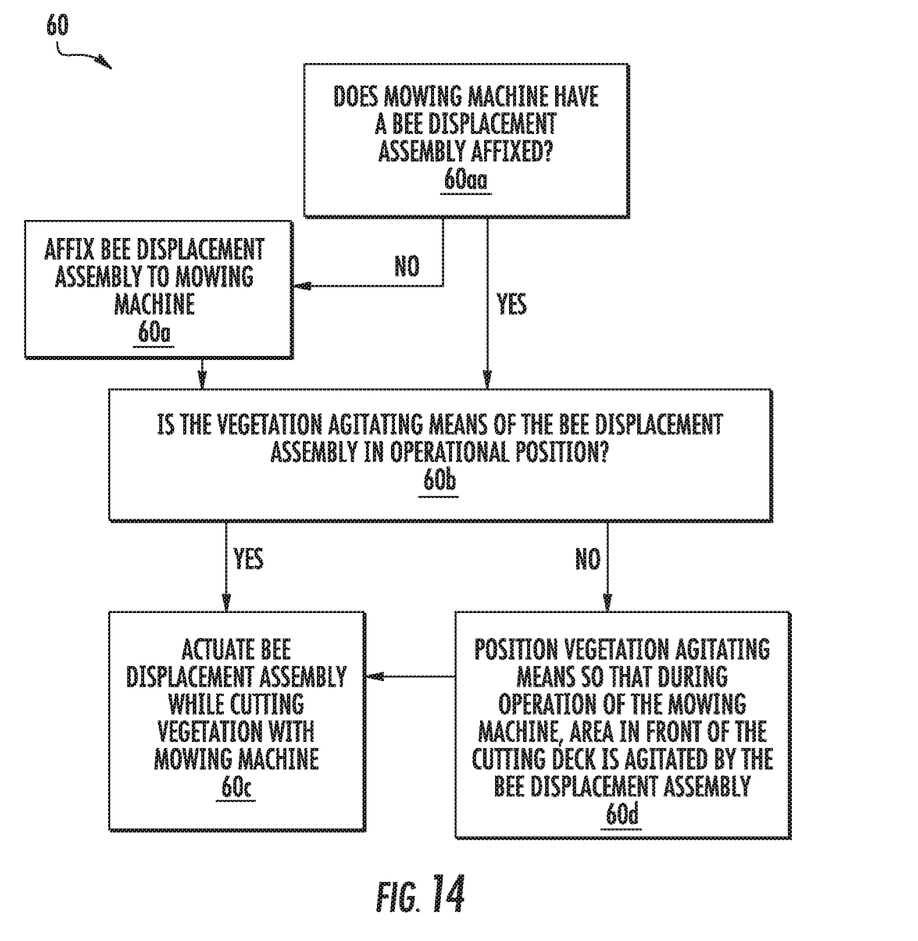
FIG. 14 is a diagrammatic representation of a method of using the bee displacement assembly.

A bee displacement assembly according to the invention is shown in FIGS. 1-13, and a method of using the bee displacement assembly is shown in FIG. 14.

Figure 1:
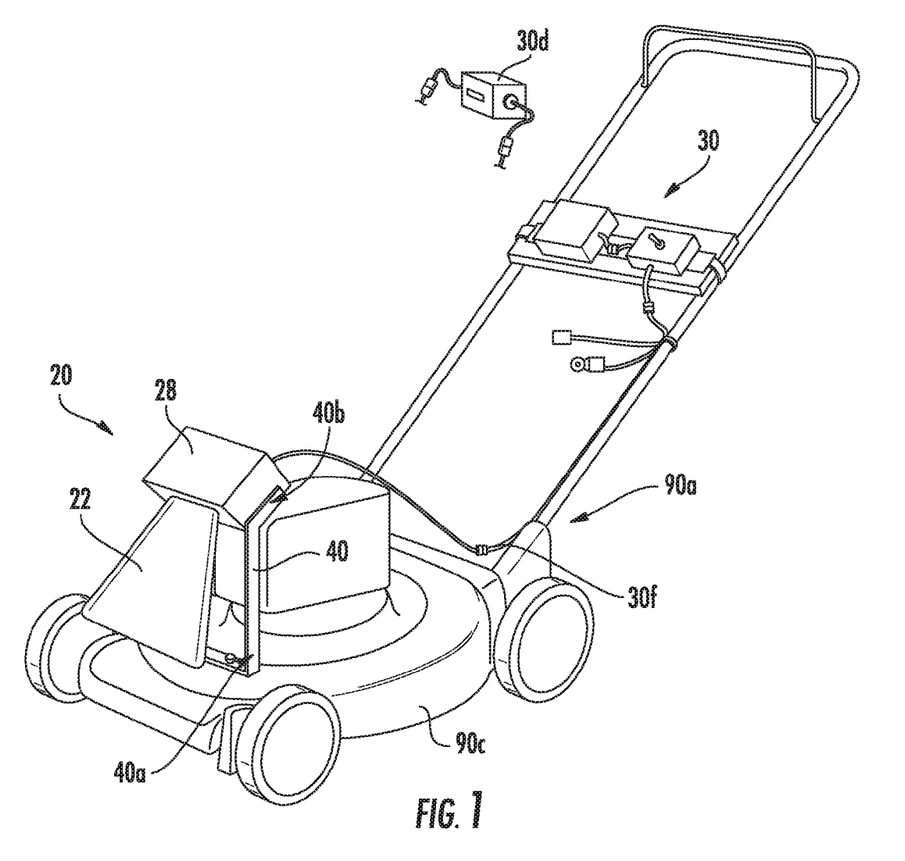
FIG. 1 is a perspective view of the bee displacement assembly according to the invention adapted for use with a typical so-called push mowing machine, the bee displacement assembly oriented in an operational position.
Figure 2:
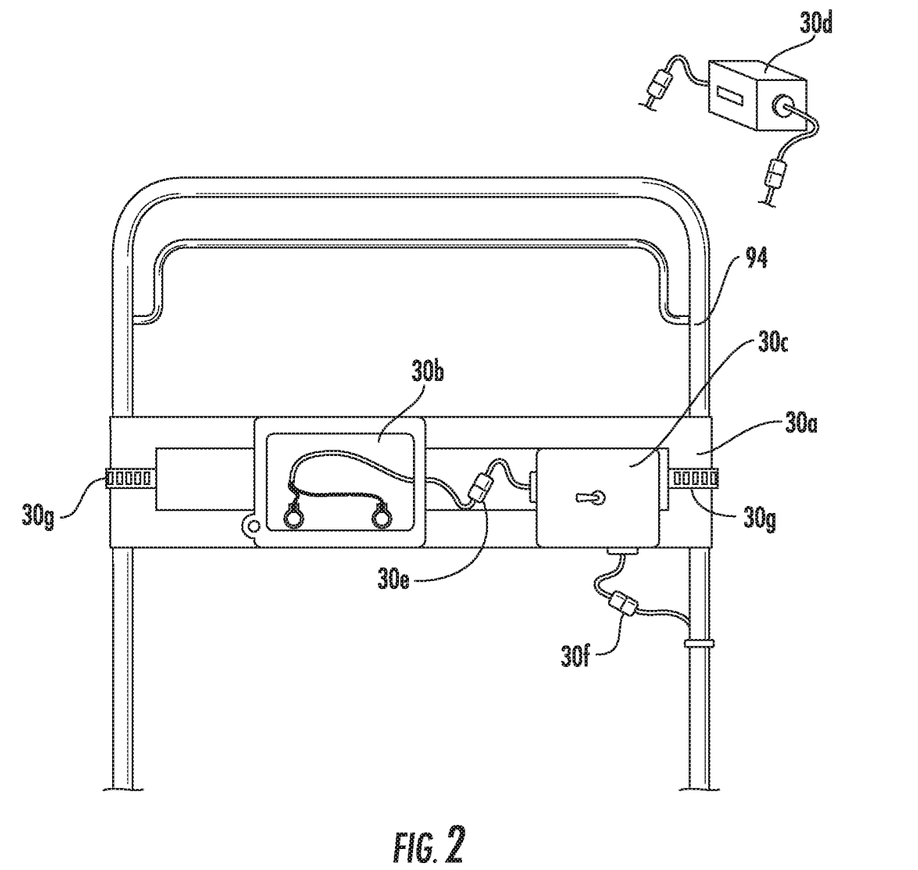
FIG. 2 is a detailed front elevational view of a power assembly of the bee displacement assembly of FIG. 1.
Figure 3:
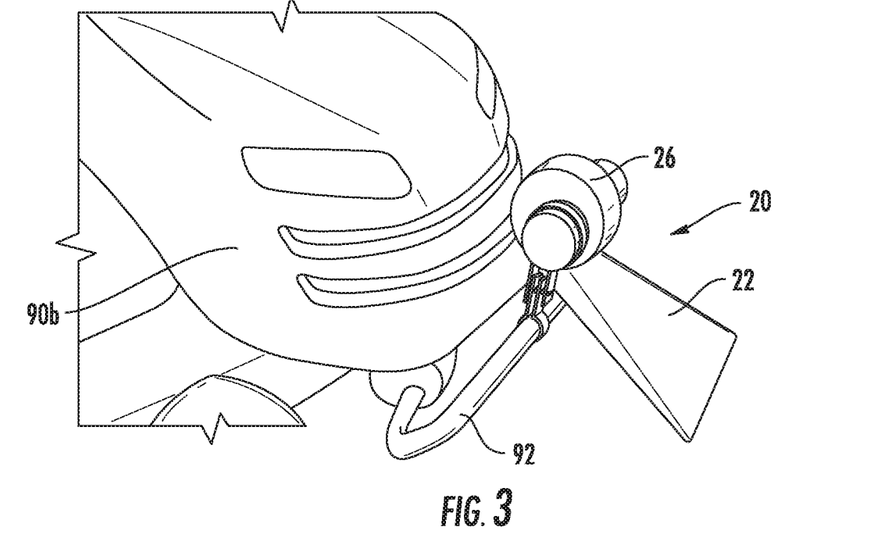
FIG. 3 is a perspective view of the bee displacement assembly adapted for use with a typical so-called residential-style riding mowing machine, with the invention oriented in the operational position.
Figure 4:
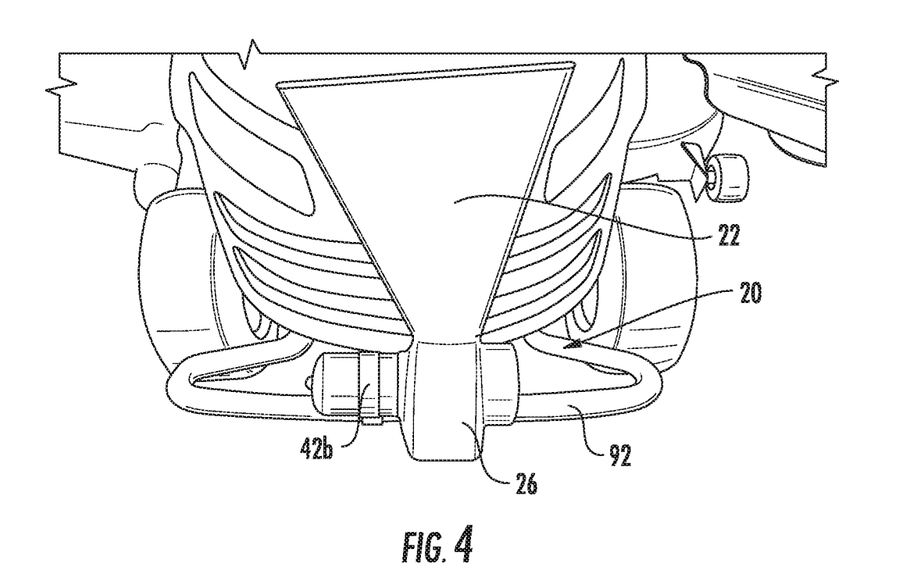
FIG. 4 is a front elevational view of the bee displacement assembly shown in FIG. 3, where the displacement assembly is oriented in a non-operation position.
Figure 6:
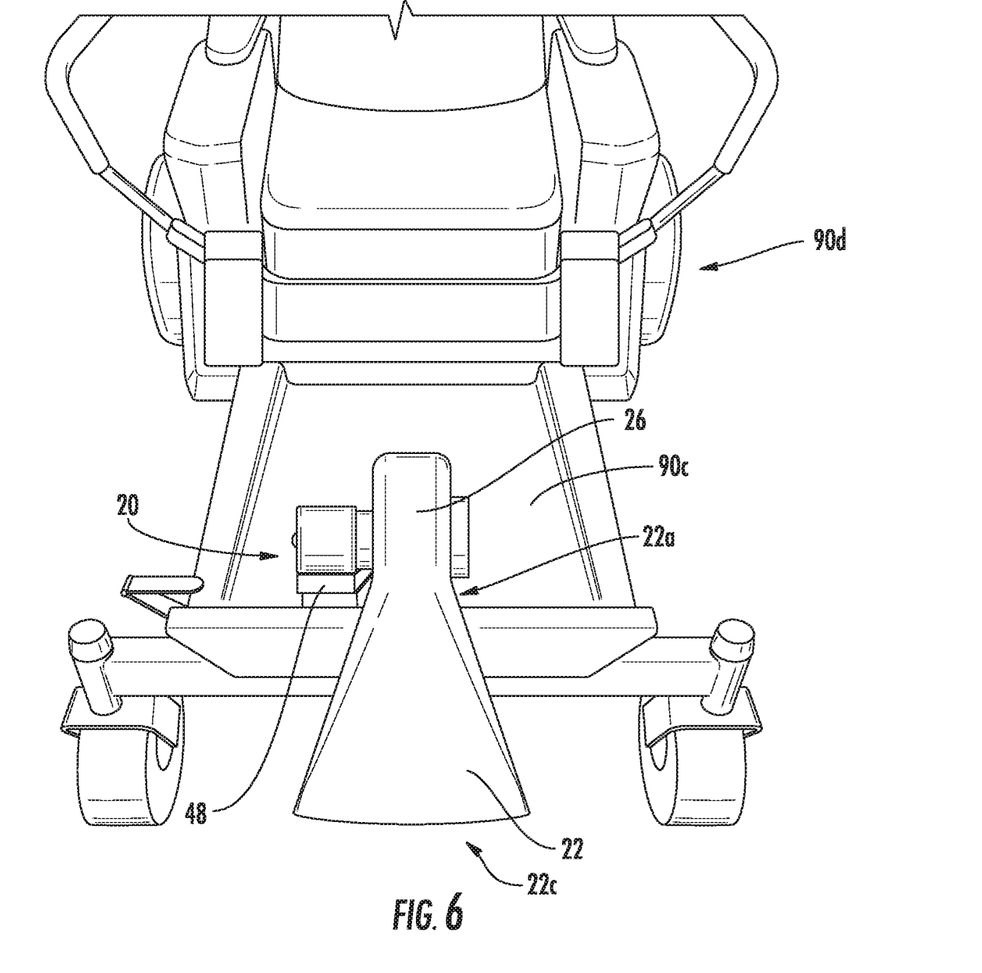
FIG. 6 is a front elevational view the bee displacement assembly according to the invention, as shown in the operational position on a so-called professional-style riding mowing machine.

Turning now to the Figures, a first embodiment of the bee displacement assembly is provided as a blower assembly 20 coupled to a power assembly 30 adapted for use with grass, brush or other vegetation-cutting machines. For use with a push-style mowing machine 90a, the blower assembly 20 is affixed to a cutting deck 90c of the mowing machine 90a, and the power assembly 30 is affixed to a handle portion 94 of the mowing machine 90a, as shown in FIGS. 1-2. For use with a residential-style riding mowing machine 90b, the blower assembly 20 is affixed to a bumper or front bar 92, as shown in FIGS. 3-4, and for a professional or zero-turn style mowing machine 90d as shown in FIG. 6, the blower assembly 20 is typically affixed to a location on the front cutting deck 90c with a bracket 48.

It should be noted that while the Figures show specific placement of the blower assembly 20 on the various types of mowing machines, these positions are suggestive of suitable locations only and not meant to limit the location of the blower assembly to just those locations. The inventor has found that an acceptable placement location of the blower assembly 20 is one in which during actuation of the blower, a concentrated stream of air is directed at an area in front of the cutting deck 90c, the stream of air angled downwards so as to sufficiently agitate the vegetation to be mowed prior to mowing by the cutting deck 90c. Hence, it is possible to orient the blower assembly so as to direct a stream of air perpendicular to the forward motion of the operational mowing machine, so long as the stream of air sufficiently agitates vegetation in the area directly in front of the cutting deck 90c.

Turning now to FIGS. 1, 3-5, and FIGS. 7-8, the blower assembly 20 is further comprised of a funnel attachment 22 coupled to a blower 26. In a typical embodiment, the funnel attachment 22 is removably coupled to the blower 26, as shown in the Figures, although in other embodiments, the funnel attachment 22 is permanently affixed to the blower 26. In the embodiment shown in FIG. 1, the blower assembly 20 is further provided with a protective box 28 housing the blower 26, the box 28 further including a filter or screen (not shown) so as to allow the free flow of air required for blower operation but which filters out particles that may otherwise clog a motor (not shown) of the blower 26. In the embodiment shown in FIGS. 3-4 for a residential-style riding mowing machine 90b, the blower 26 is shown without the blower box 28. In some embodiments, the blower 26 is further provided with a blower mouth (not shown) that couples to a neck 22a of the funnel attachment. In other embodiments, where the funnel attachment is not removable, the blower mouth is shaped and elongated so as to serve a same function as the funnel attachment 22.

Figure 7:
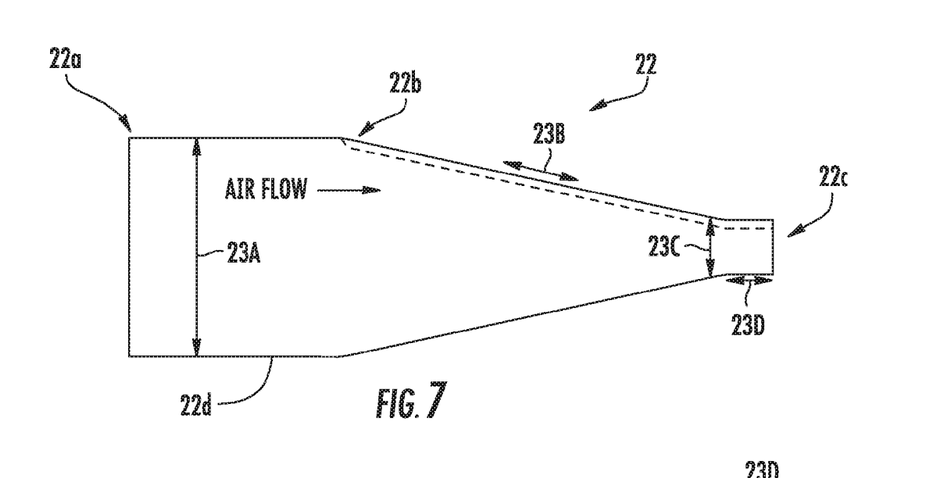
FIG. 7 is a side elevational, cross sectional view of a funnel attachment portion of the invention.
Figure 8:
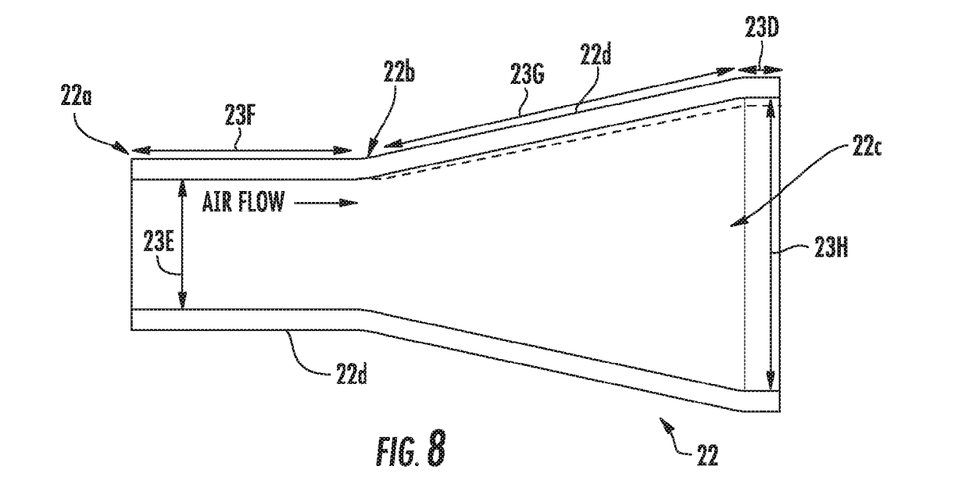
FIG. 8 is a top, cross sectional view of the funnel attachment in FIG. 7.
Figure 9:
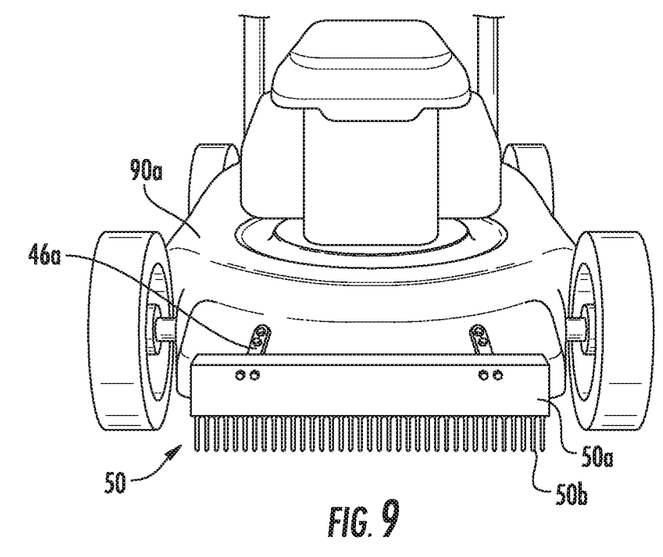
FIG. 9 is a front elevational view of a first embodiment of a bee displacement rake assembly according to the invention, as it would appear affixed to the riding mowing machine.
Figure 10:
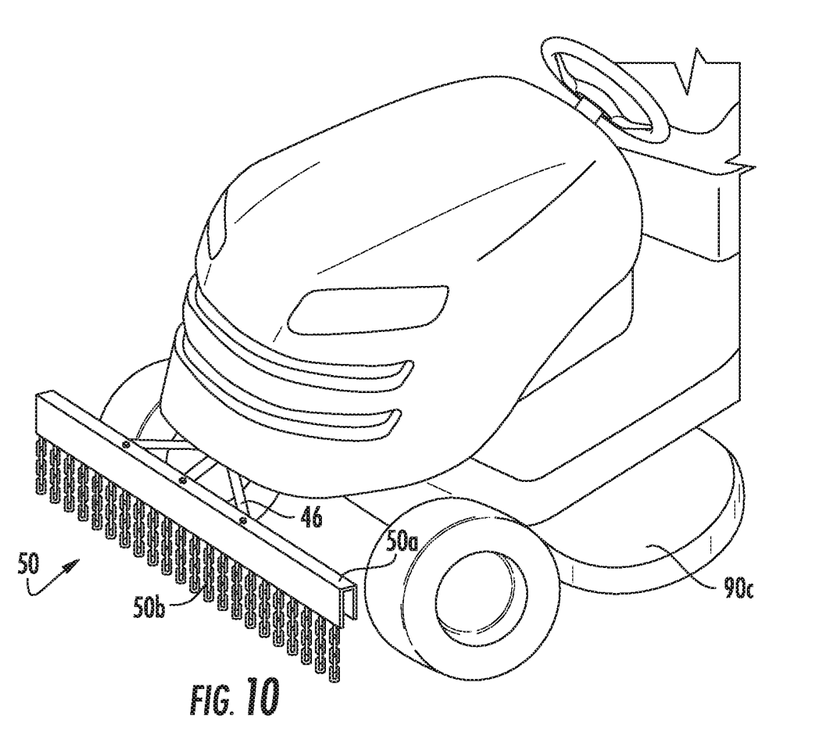
FIG. 10 is a perspective view of a second embodiment of the bee displacement rake assembly, as it would appear affixed to the riding mowing machine.

FIG. 7 is a cross sectional, side elevational view and FIG. 8 is a cross sectional top elevational view of the funnel attachment 22. Turning now to FIGS. 7-8 the funnel attachment 22 is further provided with walls 22d defining a passageway separating a neck 22a and an opposed mouth 22c, with a midpoint 22b positioned between the neck 22a and the mouth 22c.

Looking at FIG. 7, the neck 22a, in a first diameter 23A, is about three inches tall, and from the midpoint tapers downwards to the mouth 22c at a first diameter 23C, so that the first diameter 23C at the mouth 22c is between half to one inch tall. Further, the mouth 22c itself extends outwards about one inch forming a mouth extension 23D, although the inventor notes that in some embodiments, the extension 23D can be eliminated, or increased over 1 inch, as desired.

Looking now at FIG. 8, in a typical embodiment, the neck 22a is approximately three inches wide in a second diameter 23E, and at the midpoint 22b, the walls 22d progressively flare out over a length of about 7 to 10 inches, terminating at a second diameter 23H at the mouth 22c. At the mouth 22c, the second diameter 23H measures between 7 to 15 inches wide. Regarding the second diameter 23H, the inventor has noted that a width of 15 inches is an approximate ideal maximum width for the mouth 22c. In FIGS. 7 and 8, the wall length 23B 23G is about 7 inches, although could be effectively shortened or lengthened as desired and not decrease functionality of the funnel attachment. The vertical height tapering shape coupled with the horizontal width flaring shape of the funnel attachment is critical to proper operation of the invention.

The inventor has found that this particular embodiment shown in the Figures, used with a 240 CFM blower, results in a concentrated air stream able to effectively disperse bees in an area measuring about 38 to 48 inches wide located directly in front of the mouth 22c, the range of widths listed being approximately the cutting widths of the mowing machine cutting decks 90c. For the push-style mowing machine, the funnel attachment width at the mouth is about 9-10 inches for a 42 inch cut or wider. On a residential-style riding mowing machine, the funnel attachment mouth width is typically 14 inches, and up to 20 inches or more in width for a 45 inch cutting width. The inventor has tested many widths for the second diameter 23H, and notes that it typically better to use 2 blower assemblies on the mowing machine than attempt to make the funnel mouth second diameter 23H wide enough to adequately cover a mowing machine with a cutting width wider than 45 inches, since the wider and larger the mouth, the decrease in air pressure for the concentrated stream of air emitted from the mouth.

The funnel attachment 22 can accommodate larger mowing machines as well by simply by altering the length 23G 23B of the walls 22d, or by using multiple blower assemblies 20, or various combinations of multiple blower assemblies and/or larger funnel attachments 22. While the inventor has given some specific dimensions related to the funnel attachment 22, the inventor notes that a tapering height from neck to mouth (the first diameter) coupled with a flaring width shape (the second diameter) for the funnel attachment 22, where the relatively larger neck height dimension tapers down to a flattened mouth while the smaller initial neck width flares out into a wider mouth, are a critical feature of the invention, and the actual dimensions suggested are suggested guidelines only. It is the unique tapering-flaring shape of the funnel attachment which concentrates moving air generated by the blower or blower means 70 that is forced through the funnel attachment mouth 22c and emitted as the concentrated stream of air that is strong enough to effectively disperse bees and other animals along the front width of the mowing machine's cutting deck 90c. The dimensions given are thus an example of one embodiment of the funnel attachment 22, and are not meant to limit the funnel attachment 22 to these dimensions.

So long as the tapering-flaring shape of the funnel attachment 22 is maintained, a variety of dimensions for the funnel attachment are possible, however, the inventor has found that the given dimensions provide the most effective bee dispersion. In yet other embodiments (not shown), multiple inventions may be used simultaneously, so as to cover an entire width of the cutting bed 90c, without loss of air pressure due to an overly wide funnel attachment mouth.

The blower assembly 20 in a typical embodiment is removably affixed to the mowing machine 90a 90b 90d with a plurality of attachment means, such as an angled bracket 40 as shown in FIG. 1 for the push-style mowing machine 90a, a clamp 42 (FIG. 5) for attaching the blower assembly 20 to the bumper bar 92 of the residential-style riding mowing machine (FIGS. 3-4), and the simple bracket 48 on the professional-style riding mowing machine 90d (FIG. 6). The attachment means shown in the Figures are representative of some suitable methods of attaching the bee displacement assembly to the mowing machines 90a 90b 90d however the inventor has noted and tested many other styles of brackets, clamps, and other attachments means that are suitable for use with the bee displacement assembly, and the Figures are illustrative of just a few possible ways of affixing the bee displacement assembly to the various lawn mowing machines.

In FIG. 1, the angled bracket 40 is affixed to both the blower box 28 and the mowing machine 90. The angled bracket 40 is generally L-shaped, and adapted to receive the blower box (housing the blower) and funnel attachment 22 so that the blower assembly 20 can be placed at a lower position 40a or a higher position 40b on the angled bracket 40 as desired. The inventor has found that the best operational angle of the funnel attachment ideally emits a stream of concentrated air generally horizontally across the vegetation in front of the cutting deck, rather than forcing the air downwards on the vegetation, since sometimes air that is angled downwards knocks the bees deeper into the vegetation (where they end up getting run over by the mower and killed) but a more horizontal air stream tends to displace the bees so that they fly away from danger.

Figure 5:
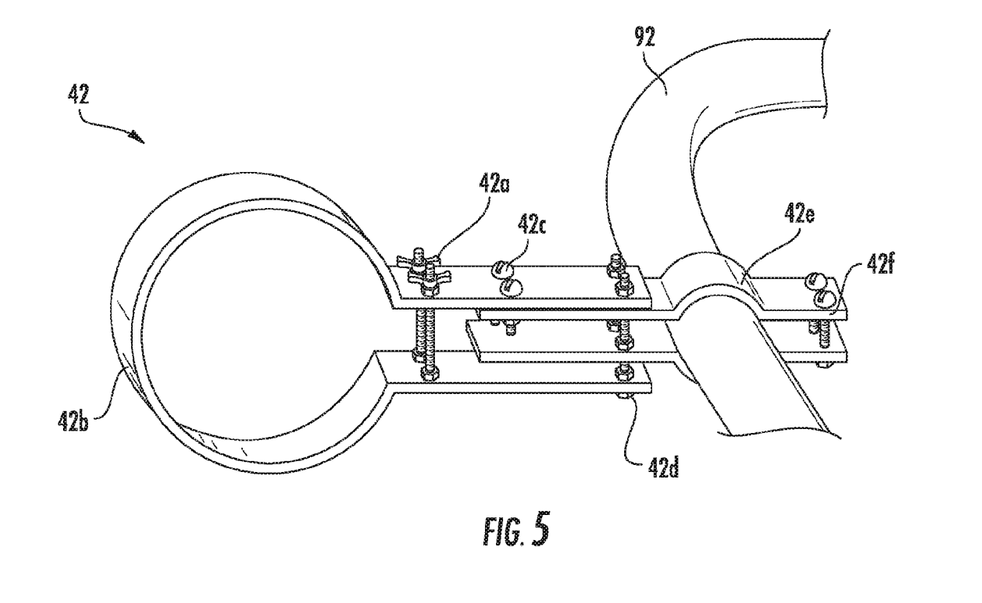
FIG. 5 is a perspective view of a clamp used to affix the bee displacement assembly according to the invention to the riding mowing machine shown in FIGS. 3 and 4.

For the residential-style riding mowing machine 90b shown in FIGS. 3-4, and in more detail in FIG. 5, the clamp 42 is comprised of a blower clamp 42b affixed to a bumper clamp 42e by way of adjustable fasteners 42a 42c 42d, the bumper clamp 42e removably affixed to the bumper 92 of the mowing machine 90b by fasteners 42f. The adjustable fasteners 42a 42c 42d allow the blower assembly 20 to be pivotably affixed to the clamp 42, so that the angle at which the stream of air is emitted through the mouth 22c may be adjusted, as necessary, shown in FIGS. 3-4. When not in use, the blower assembly 20 can be adjusted upwards, as shown in FIG. 4, or simply left in operational position, as shown in FIG. 3, as desired.

The blower 26 is typically a motorized blower powered by a power assembly 30 (see FIG. 2), by way of a wire harness 32b coupling the blower 26 to an on/off switch assembly 30c, and by a second wire harness 32a coupling the on/off switch assembly 30c to a battery 30b. The on/off switch assembly 30c is further provided with a fuse (not shown) housed inside an electrical box. The battery 30b is provided as a 12 volt battery weighing approximately four pounds, and capable of providing about an hour's worth of blower operation. The wire harnesses 32a 32b are provided so as to facilitate easy connection and disconnection of the power assembly 30. The inclusion of the battery allows manufacturers of push-style mowing machines to incorporate an electric start for the mowing machine. In other embodiments (not shown), lights may be included in the power assembly 30 that are powered by the battery 30b. The power assembly 30 is affixed to the push-style lawn mowing machine 90a by way of a power bracket 30a removably affixing the power assembly 30 to a handle portion 94 of the push-style mowing machine 90a.

In yet another embodiment, the bee displacement assembly is provided as a kit comprising the blower assembly 22, a power assembly 30, and an optional battery charger 30d, along with a suitable bracket or other attachment means, so as to allow retrofitting existing push-style mowing machines 90a. For retrofitting existing riding mowing machines 90b 90d, the kit includes the blower assembly 22, the appropriate attachment means, and the on/off power assembly 30c and appropriate wire harnesses 30d 30f so as to allow the blower assembly to be coupled to the mowing machine's existing power supply to power and permit the use of the external on/off control 30c. The funnel attachment 22 may also be sold without the blower 26 in a variety of dimensions.

Suitable blowers used by the inventor includes the Dayton® series blowers, and the Jabsco Blower, Flex Mount, 250 CFM, 12 VDC sold by W.W. Grainger Inc., of Lake Forest, Ill. 60045-5201, for a blower that is 7×7×7 inches, fitting an enclosure box measuring about 8×8×8 inches. Other blowers in the range of 240 to 250 CFM are suitable for use with the invention. For hook up to the mowing machine's internal battery, of powering the blower using a separate battery, an off the shelf blower and mowing machine can be used, retrofitted with the funnel attachment 22 and affixed to the mowing machine using the appropriate blower 26 or blower assembly 20, as needed, and also with the appropriate power assembly 30, depending on the style of mowing machine.

Figure 11:
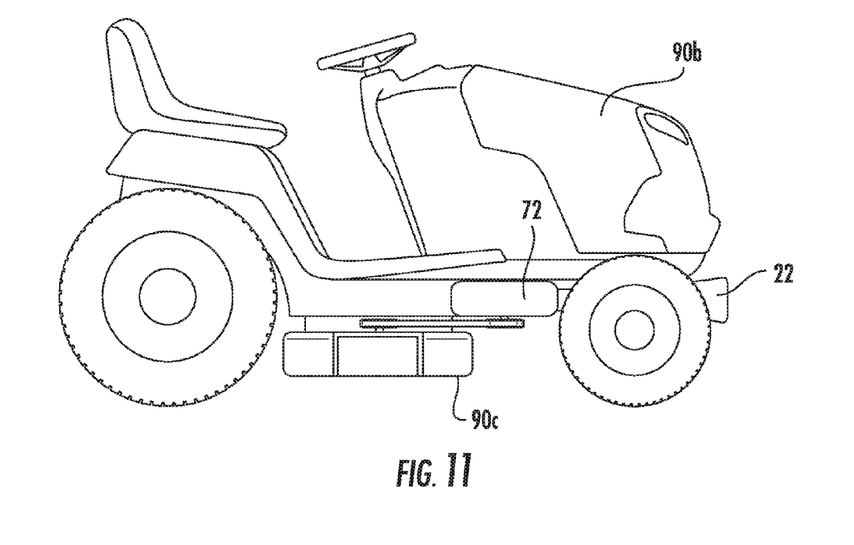
FIG. 11 is a side elevational view of a second embodiment of the bee displacement assembly according to the invention, in which a motor of the mowing machine turns a fan housed within a secondary deck structure.
Figure 12:
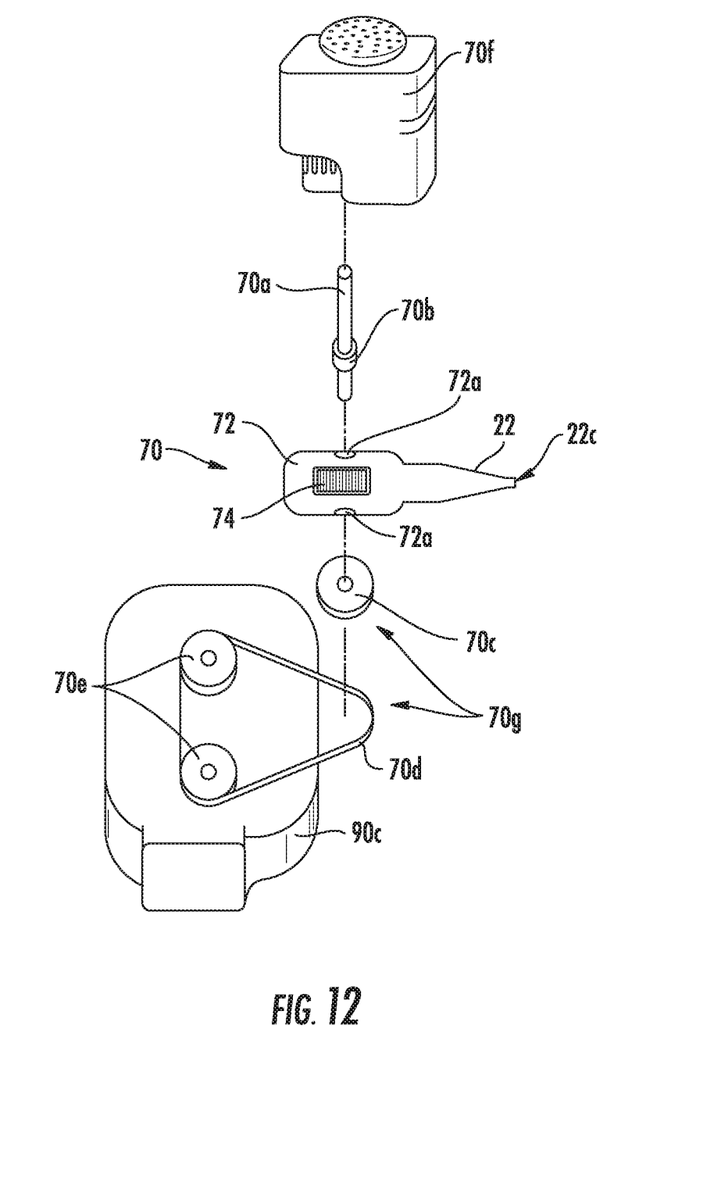
FIG. 12 is a cross sectional, side elevational view of the second embodiment of the bee displacement assembly from FIG. 11, showing how the second embodiment is installed in the mowing machine via an exploded view of the mowing machine's motor, pulley system and cutting deck.

In yet another embodiment, shown in FIGS. 11-13, a second blower assembly 70 is shown coupled to existing apparatuses of the mowing machine 90b. The second blower assembly 70 is comprised of a fan 74 enclosed in an interior space of a secondary deck or fan housing 72, the housing 72 having a pair of opposed through-bores 72a sized and shaped to receive a drive shaft 70a and a clutch 70b of the mowing machine 90b. The fan housing is further configured with an opening adapted to receive the funnel attachment 22, or in some embodiments, as shown in FIG. 12, the funnel attachment 22 and fan housing 72 are formed as a single housing preserving the unique tapering-flaring shape of the funnel attachment 22.

Turning now to FIG. 12, the blower assembly 70 is coupled to an engine or motor 70f as well as to a pulley system 70g of the mowing machine 90b via the drive shaft-clutch system. The pulley system 70g is typically installed on the cutting deck 90c of the mowing machine, and the drive pulley 70c and a set of other pulley wheels 70e linked together by a drive belt 70d are turned by the motor 70f turning the drive shaft-clutch system. The pulley system is responsible for powering a plurality of cutting blades housed under the mowing deck 90c. In the embodiment shown in FIGS. 11-13, the fan 74 is turned directly by the motor 70f via the drive shaft 70a, but the inventor notes that he has tested an embodiment of the blower assembly 70 (not shown) that can be powered by a secondary pulley system, by adding a second pulley and second belt to the existing system, so that the motor turns both pulley systems, and the second system is used to turn the fan 74 and create the concentrated stream of air needed to disperse the bees.

An on/off switch (not shown) is included with the controls of the mowing machine, and in some instances, such as when an existing mowing machine is retrofitted with the bee displacement assembly, the on/off switch may be housed in a control box affixed to the outside of the mowing machine housing. The inventor has experimented with a number of different ways to selectively operate the fan 74, such as with lever-cable-spline arrangements, although he notes that there are many ways in which selective operation of the second blower assembly 70 can be achieved. In the embodiment shown in the Figures, the bee displacement assembly is on only when the motor is running.

To use the bee displacement assembly using the second blower assembly, an operator starts the motor of the mowing machine 90b, and turns on the bee displacement assembly. The clutch 70b engages the drive shaft 70a and the drive pulley 70c. The drive pulley engages the belt 70d, which turns the other pulleys 70e linked by the belt 70d to the drive pulley. The cutting blades of the mowing machine are activated, and the drive shaft turns the fan 74, generating moving air that is then in turn channeled and emitted through the funnel attachment 22 as the concentrated stream of air. When the operator stops the motor, the bee displacement assembly is also turned off.

The bee displacement invention displaces bees by physically agitating vegetation directly in front of the cutting deck 90c. In yet another embodiment of the bee displacement invention, shown in FIGS. 9-10, a rake attachment 50 is affixed to the mowing machine by way of a bracket 46 46a or other attachment means, the rake having a head 50a and attached tines 50b projecting from the head 50a in a downwards orientation (towards the ground). The tines 50b are positioned so as to agitate the vegetation directly in front of the cutting deck when the mowing machine is in operation, encouraging the bees to move away from the immediate vicinity. In a first embodiment, shown in FIG. 9, the tines 50b are arranged in a regular spaced-apart relationship, and are comprised of metal, plastic or other suitably strong, flexible material. The inventor notes that memory metal is an ideal material for the tines, as it is durable and flexible. In a second embodiment, shown in FIG. 10, the tines 50b are flexible, and may be comprised of small chains (as shown) that drag against the vegetation which allows for mowing over uneven surfaces as the tines self adjust to the height of the ground, preventing the tines from digging into the ground or otherwise damaging the vegetation. The rake 50 may be used alone or in conjunction with the blower assembly 22 70. In still another embodiment, the rake 50 is adjustably affixed to the mowing machine 90a 90b 90d so as to allow the operator to lift the rake as needed or desired independently of operation of the blower assembly and the mowing machine. In this way, the operator can decide whether to use just the blower assembly, the rake, or both together.

Looking now at FIG. 14, a method 60 of displacing bees and other animals using the bee displacement assembly, the invention, configured either with a blower assembly 20 or a second blower assembly 70 is affixed to the desired mowing machine 90a 90b 90d 60a if the mowing machine is not already outfitted with the bee displacement assembly. Then, the operator must determine if the vegetation agitation means 20 22 50 is in an operational position 60b. Operational position for the bee displacement assembly using the blower assembly 20 70 and funnel attachment 22 requires the funnel attachment 22 to be positioned so that the mouth 22c is angled in front of the cutting deck 90c. For the rake 50, the rake tines 50b must be lowered sufficiently so as to contact vegetation in front of the cutting deck. The mowing machine is started along with the bee displacement assembly 60c. When the funnel attachment is used in conjunction with the blower 26 or the pulley-driven fan 74 shown in FIG. 13, the bee displacement assembly is actuated, forcing the air generated by the blower or the fan into the neck of the funnel attachment and emitted out the mouth 22c as the concentrated stream of air. When the funnel attachment is appropriately angled, the stream of air disturbs an area in front of the cutting deck 90c, and ideally, disturbs an area equal to the width of the cutting deck 90c. The mowing machine is used in its normal fashion, but the stream of concentrated air emitted from the mouth 22c sufficiently disturbs vegetation in the target area, causing animals such as bees to move away from the area immediately in front of the cutting deck 90c. The operator of the mowing machine can selectively operate the bee displacement assembly by actuating the on/off switch assembly 30c, as a power-saving feature. In other embodiments, the bee displacement assembly is always operational when the mowing machine is operational.

The inventor stresses that bees gathering nectar tenaciously cling to flowers, and ordinary wind pressure, even on very windy days, is inadequate to encourage the bees to leave their respective flowers. Bees are very difficult to see on vegetation being cut, because the mowing machines move quickly, and even the most ardent bee-lover is usually oblivious to the fact that his or her lawn mower is responsible for the deaths of thousands of honeybees over a typical summer all in the name of keeping the lawn neat and tidy. The bee displacement assembly and its embodiments, and the method of moving bees is the creative culmination of the inventor's desire to save the honeybee.

It is to be understood that the above-described arrangements are only illustrative of the application of the principles of the present invention. Numerous modifications and alternative arrangements may be devised by those skilled in the art without departing from the scope of the present invention. While the inventor is concerned with saving bees, there are many insect pollinators that will also be effectively displaced by the invention. Young animals, such as fawns and rabbit kits, hiding in tall grass are often killed by high speed riding or zero-turn mowing machines, and may be encouraged to move out of the way of an oncoming mowing machine when blasted with the concentrated stream of air, or alternatively, the stream of air moves the vegetation sufficiently to allow the operator to visualize and then avoid killing the young animal or destroying a hidden nest in the grass.

What is claimed is:

1. A method of displacing bees in an area of vegetation subject to cutting by a mowing machine, the method comprising the steps of:
   powering a mowing machine blower assembly comprised of a riding mowing machine and a blower assembly;
   positioning a mouth of the blower assembly in an operational position; and
   actuating a plurality of cutting blades of the riding mowing machine and a fan of the blower assembly immediately prior to cutting the area of vegetation with the plurality of cutting blades;
   wherein the step of positioning the mouth in an operational position is further comprised of orienting the mouth such that a stream of air created by the actuated blower assembly and emitted out the mouth contacts the area of vegetation directly in front of the cutting deck as a horizontal stream of air parallel to a ground surface and a vertical distance from the ground surface no higher than a vertical height of vegetation in the area of vegetation;
   wherein the stream of air created by the blower assembly blows on a width dimension of the area of vegetation in front of a cutting deck of the mowing machine that is about a same width dimension as the cutting deck;
   wherein the step of actuating the blower assembly agitates the area of vegetation immediately in front of the cutting deck with the stream of air emitted out the mouth; and
   wherein the method is performed by the mowing machine blower assembly comprising:
   the riding mowing machine, comprising:
   a plurality of wheels;
   a frame body supported by the plurality of wheels;
   wherein the frame body is further comprised of a drive unit housing and a cutting deck upon which a belt drive system is mounted, the belt drive system comprising a drive pulley and two additional pulleys rotatably coupled to the drive pulley by a belt;
   the plurality of cutting blades housed under the cutting deck rotatably coupled to the belt drive system;
   a drive unit housed inside the drive unit housing, the drive unit comprising a drive shaft and a the motor, the motor mounted to the drive shaft;
   wherein the drive pulley is directly mounted to the drive shaft; and
   wherein the motor supplies drive power to the plurality of wheels and to the plurality of cutting blades by turning the drive shaft; and the blower assembly, comprising:
the fan;
a fan drive shaft; and
a fan housing having an interior space sized and shaped to house the fan, and a pair of through holes sized and shaped to receive the drive shaft;
wherein the fan housing is mounted to the frame body such that it is positioned below the drive unit and above the cutting deck;
wherein the fan drive shaft and the drive shaft of the drive unit are a same drive shaft;
wherein the fan is directly mounted on the drive shaft, with the fan positioned on the drive shaft below the motor and above the drive pulley;
wherein the fan housing is formed with an opening disposed as a funnel terminating in a mouth; and
wherein the mouth is oriented and the funnel is sized and shaped such that a stream of air from the fan being turned directly by the motor turning the drive shaft is collected and concentrated by the funnel and forced out of the mouth onto a quantity of vegetation immediately in front of the cutting deck and prior to cutting the quantity of vegetation by the plurality of cutting blades.

* * * * *